United States Patent
Shi et al.

(10) Patent No.: US 12,127,022 B2
(45) Date of Patent: Oct. 22, 2024

(54) METHOD FOR REPORTING MEASUREMENT QUANTITIES, METHOD FOR DETERMINING MEASUREMENT QUANTITIES, AND DEVICES

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 710 days.

(21) Appl. No.: 17/154,885

(22) Filed: Jan. 21, 2021

(65) Prior Publication Data
US 2021/0144578 A1 May 13, 2021

Related U.S. Application Data

(63) Continuation of application No. PCT/CN2018/098678, filed on Aug. 3, 2018.

(51) Int. Cl.
*H04W 24/10* (2009.01)
*H04B 17/309* (2015.01)

(52) U.S. Cl.
CPC .......... *H04W 24/10* (2013.01); *H04B 17/309* (2015.01)

(58) Field of Classification Search
CPC ... H04W 24/10; H04B 17/309; H04B 17/327; H04B 17/336; H04B 17/24
See application file for complete search history.

(56) References Cited

U.S. PATENT DOCUMENTS

| 2003/0016641 | A1 | 1/2003 | Terry et al. |
| 2009/0274204 | A1 | 11/2009 | Chen et al. |
| 2016/0112996 | A1 | 4/2016 | Ou et al. |
| 2018/0219664 | A1* | 8/2018 | Guo ...................... H04W 24/10 |
| 2021/0297850 | A1* | 9/2021 | Matsumura ........... H04W 24/10 |

FOREIGN PATENT DOCUMENTS

| CN | 103220704 A | 7/2013 |
| CN | 103369587 A | 10/2013 |
| CN | 104782159 A | 7/2015 |

(Continued)

OTHER PUBLICATIONS

3GPP "Digital Cellular Telecommunications system (Phase 2+); Radio subsystem link control (3GPP TS 45.008 ver. 10.0.0 Release 10)" ETSI TS145 008 V10.0.0 (Apr. 2011). 152 pages.

(Continued)

*Primary Examiner* — Mohammad S Adhami
*Assistant Examiner* — Jesse P. Samluk
(74) *Attorney, Agent, or Firm* — Perkins Coie LLP

(57) ABSTRACT

The present disclosure provides a method for reporting measurement quantities, a method for determining measurement quantities, and devices. The method comprises: a terminal device determines measurement quantities of K signals, the measurement quantities comprising RSRQ and/or SINRs; and the terminal device reports the measurement quantities of the K signals to a network device, wherein K is a positive integer.

14 Claims, 3 Drawing Sheets

A terminal device determines measurement quantities of K signals, wherein the measurement quantities include reference signal receiving quality (RSRQ) and/or signal to interference plus noise ratio (SINR) — S210

The terminal device reports the measurement quantities of the K signals to a network device, wherein K is an integer — S220

(56) References Cited

FOREIGN PATENT DOCUMENTS

| CN | 106162673 A | 11/2016 |
| EP | 2849491 A1 | 3/2015 |
| EP | 3832894 A1 | 9/2021 |
| GB | 2500254 A | 9/2013 |
| WO | 2012144841 A2 | 10/2012 |
| WO | 2016045067 A1 | 3/2016 |

OTHER PUBLICATIONS

EPO, Extended European Search Report for European Patent Application No. 18928650.3. Mail Date: Jun. 21, 2021. 9 pages.
Samsung "Corrections on Beam Reporting and Indication" R1-1804358; 3GPP TSG RAN WG1 Meeting #92bis, Sanya, China, Apr. 16-20, 2018. 8 pages.
EP Application No. 18928650.3-1216 Examination Report Mailed Mar. 29, 2023, pp. 1-7.
Taiwan Application No. 108127650 Decision of Rejection Mailed Mar. 24, 2023, pp. 1-15.
Chinese Application No. 202210215264.3 First Office Action Mailed Mar. 2, 2023, pp. 1-16.
Chinese Application No. 202210215264.3 Second Office Action Mailed May 5, 2023, pp. 1-13.
International Search Report mailed Apr. 25, 2019 of PCT/CN2018/098678 (4 pages).
Ericsson "Beam sorting order for measurement reporting" R2-1801314; 3GPP TSG RAN WG2 AH-1801; Vancouver, Canada; Jan. 22-26, 2018. 2 pages.
Ericsson "Report mapping for measurements" R4-1808713; 3GPP TSG RAN WG4 Meeting #AH 1807; Montreal, Canada; Jul. 2-6, 2018. 8 pages.
Examination Report No. 1 for Australian Application No. 2018435341 issued Nov. 30, 2022. 3 pages.
Office Action for Taiwanese Application No. 108127650 issued Dec. 27, 2022. 39 pages with English translation.
Request for Submission of an Opinion for Korean Application No. 10-2021-005484 issued Feb. 20, 2023. 10 pages with English translation.
Preliminary Rejection for Korean Application No. 10-2021-7005484 Issued Aug. 29, 2023, 8 Pages with English Translation.
Decision of Rejection for Chinese Application 2022102152643 Issued Jul. 19, 2023, 13 Pages with English Translation.
Oral Proceedings of the European application No. 18928650.3, issued on Jun. 25, 2024. 8 pages.

* cited by examiner

METHOD FOR REPORTING MEASUREMENT QUANTITIES, METHOD FOR DETERMINING MEASUREMENT QUANTITIES, AND DEVICES

This application is a continuation application of International PCT Application No. PCT/CN2018/098678 filed on Aug. 3, 2018, the entire content of which is hereby incorporated by reference.

TECHNICAL FIELD

The present disclosure relates to the field of communication, and more particularly, relates to a method for reporting measurement quantities, a method for determining measurement quantities, and devices.

BACKGROUND

At present, a new radio (NR) system mostly adopts a beam management mechanism. After adopting beamforming technology, a network device may completely cover a cell through multiple beams with different directions. A terminal device measures wireless signals emitted by different beams, and reports relevant information of each signal to the network device. The network device determines a best emitting beam aiming at the terminal device according to the relevant information of each signal reported by the terminal device.

Because NR system has a high requirement on quality of signal transmission, how to measure the relevant information of different beams to accurately reflect the quality of the signal transmission is an urgent problem to be solved.

SUMMARY

There are provided a method for reporting measuring quantities, a method for determining measuring quantities, and a device in the present disclosure.

In a first aspect, there is provided a method for reporting measurement quantities, including: determining, by a terminal device, measurement quantities of K signals, wherein the measurement quantities include reference signal reception quality (RSRQ) and/or signal to interference plus noise ratio (SINR); and reporting, by the terminal device, the measurement quantities of the K signals to a network device, wherein k is a positive integer.

In a second aspect, there is provided a method for determining measurement quantities, including: receiving, by a network device, bit values corresponding to measurement quantities of K signals reported by a terminal device, wherein the measurement quantities include RSRQ and/or SINR, and K is a positive integer; determining, by the network device, the measurement quantities of the K signals according to the bit values corresponding to the measurement quantities of the K signals.

In a third aspect, there is provided a terminal device, configured to execute the method in above first aspect or any optional implementation of the first aspect. Specifically, the terminal device includes function modules for executing the method in above first aspect or any optional implementation of the first aspect.

In a fourth aspect, there is provided a network device, configured to execute the method in above second aspect or any optional implementation of the second aspect. Specifically, the terminal device includes function modules for executing the method in the second aspect or in any optional implementation of the second aspect.

In a fifth aspect, there is provided a terminal device, including a processor and a memory. The memory is configured to store a computer program, and the processor is configured to call and run the computer program stored in the memory to execute the method in the first aspect or each implementation thereof.

In a sixth aspect, there is provided a terminal device, including a processor and a memory. The memory is configured to store a computer program, and the processor is configured to call and run the computer program stored in the memory to execute the method in the second aspect or each implementation thereof.

In a seventh aspect, there is provided chip. The chip is configured to implement the method in above first aspect or any possible implementation of the first aspect. Specifically, the chip includes a processor configured to call and run a computer program from a memory, enabling a device on which the chip is installed to execute the method as in the first aspect or any possible implementation of the first aspect.

In an eighth aspect, there is provided chip. The chip is configured to implement the method in above second aspect or any possible implementation of the second aspect. Specifically, the chip includes a processor configured to call and run a computer program from a memory, enabling a device on which the chip is installed to execute the method as in the second aspect or any possible implementation of the second aspect.

In a ninth aspect, there is provided a computer readable medium, configured to store a computer program, wherein the computer program enables a computer to execute the method of the first aspect or any possible implementation of the first aspect.

In a tenth aspect, there is provided a computer readable medium, configured to store a computer program, wherein the computer program enables a computer to execute the method of the second aspect or any possible implementation of the second aspect.

In an eleventh aspect, there is provided a computer program product, including computer program instructions, wherein the computer program instructions enables a computer to execute the method of the first aspect or any possible implementation of the first aspect.

According to a twelfth aspect, there is provided a computer program product, including computer program instructions, wherein the computer program instructions enables a computer to execute the method of the second aspect or any possible implementation of the second aspect.

In a thirteenth aspect, there is provided a computer program, when the computer program is run on a computer, the computer is enabled to execute the method of the first aspect or any possible implementation of the first aspect.

In a fourteenth aspect, there is provided a computer program, when the computer program is run on a computer, the computer is enabled to execute the method of the second aspect or any possible implementation of the second aspect.

DETAILED DESCRIPTION

Technical solutions in implementations of the present disclosure will be clearly and completely described below with reference to drawings in implementations of the present disclosure.

The technical solution of implementations of the present disclosure may be applied to various communication systems, such as a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), an Advanced long term evolution (LTE-A) system, an NR system, an evolution system of NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access, WiMAX) system, a Wireless Local Area Networks (WLAN), a Wireless Fidelity (WiFi), a next generation communication system or other communication systems etc.

Implementations of the present disclosure do not limit applied spectrums. For example, implementations of the present disclosure may be applied to both a licensed spectrum and an unlicensed spectrum.

Figure 1:
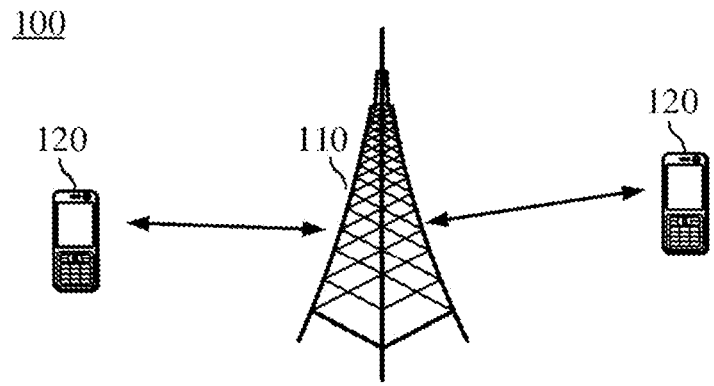
FIG. 1 is a schematic diagram of a wireless communication system applied in an implementation of the present disclosure.

FIG. 1 shows a wireless communication system 100 applied in an implementation of the present disclosure. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a 5G network, or a network device in a future evolved Public Land Mobile Network (PLMN), etc.

The wireless communication system 100 also includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), etc. Optionally, a Device to Device (D2D) communication may be performed between the terminal devices 120.

Optionally, a 5G system or network may also be called an NR system or network.

FIG. 1 illustratively shows one network device and two terminal devices. Optionally, the wireless communication system 100 may include multiple network devices, and other quantity of terminal devices may be included within the coverage area of each network device, and this is not limited in implementations of the present disclosure.

Optionally, the wireless communication system 100 may also include other network entities, such as an Access and Mobility Management Function (AMF), a Session Management Function (SMF), a Unified Data Management (UDM), or an Authentication Server Function (AUSF), and this is not limited in implementations of the present disclosure.

In addition, various aspects or features of the present disclosure may be implemented as methods, devices, or products using standard programming and/or engineering techniques. The term "product" used in the present disclosure encompasses a computer program accessible from any computer-readable component, carrier, or medium. For example, the computer-readable medium may include, but not limited to, a magnetic storage device (such as a hard disk, a floppy disk, or a magnetic tape, etc.), a disk (such as a compact disc (CD), a Digital Versatile Disc (DVD), a smart card and a flash component (such as an Erasable Programmable Read-Only Storage (EPROM), a card, a stick or a key drive). In addition, the various storage medium described herein may represent one or more devices and/or other machine-readable medium for storing information. A term "machine-readable medium" may include, but is not limited to, various media capable of storing, containing and/or carrying instructions and/or data.

It should be understood that the terms "system" and "network" are often used interchangeably herein. The term "and/or" herein is merely an association relationship describing associated objects, indicating that there may be three relationships, for example, A and/or B may indicate three cases: A alone, A and B, and B alone. In addition, a symbol "/" herein generally indicates objects before and after the symbol "/" have an "or" relationship.

At present, the NR system mostly adopts a beam management mechanism. After adopting beamforming technology, the network device may completely cover a cell through multiple beams with different directions. In a downlink process, the network device may use beams with different directions to emit a wireless signal, and this process is called beam sweeping. At the same time, the terminal device may measure the wireless signals emitted by different beams and report relevant information of each signal to the base station. The network device determines a best emitting beam aiming of the terminal device according to the relevant information of each signal reported by the terminal device.

The multi-beam system of the NR system covers a whole cell with different beams, that is, each beam covers a small area. An effect of covering the whole cell with multiple beams is achieved by scanning beams in time.

At present, different beams are identified by different signals carried on the beams.

For example, different synchronization signal blocks (SSBs) are transmitted on different beams, and the terminal device may identify different beams through the SSB.

For another example, different channel state information reference signals (CSI-RSs) are transmitted on different beams, and the terminal device may identify different beams through the CSI-RS or CSI-RS resources.

Implementations of the present disclosure may measure and report signals for signals carried on the beams. For example, the terminal device may measure and report the CSI-RS and/or the SSB.

In a multi-beam system, the terminal device needs to measure signals, and judge which beams have better transmission quality based on measurement results, and report the relevant information (such as which beams have the better signal quality and their corresponding measurement results) to the network device.

In a traditional beam measurement, generally, a reference signal receiving power (RSRP) is measured and compared, and then a signal with a higher RSRP value is selected for reporting.

However, the NR system has a high requirement on the transmission quality of the signal, and the measurement results of the RSRP may not accurately reflect the transmission quality of the signal. Therefore, how to select the measurement quantity of the signal to reflect the transmission quality of the signal has become an urgent problem to be solved.

In view of the above problems, implementations of the present disclosure propose a method for reporting measurement quantities, which may accurately reflect the transmission quality of signals.

Figure 2:
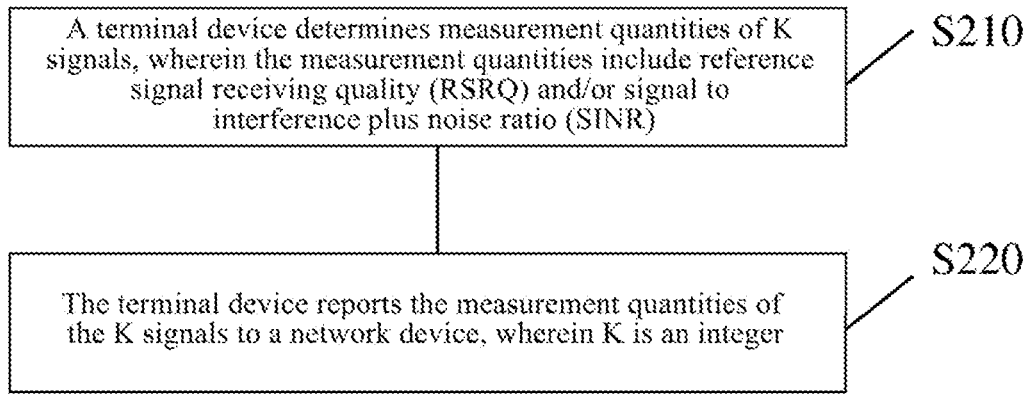
FIG. 2 is a schematic block diagram of a method for reporting measurement quantities provided by an implementation of the present disclosure.

FIG. 2 is a method for reporting measurement quantities provided by an implementation of the present disclosure, and the method in FIG. 2 includes at least part of following contents.

In step 210, a terminal device determines measurement quantities of K signals, wherein the measurement quantities include reference signal receiving quality (RSRQ) and/or signal to interference plus noise ratio (SINR), and K is a positive integer.

The RSRQ indicates reception quality of the signal, and may reflect transmission quality of the signal to a certain extent. Therefore, the terminal device measures RSRQ and reports it to a network device, being beneficial for the network device to find a best signal to communicate with the terminal device.

Larger the RSRQ value of the signal, better the transmission quality of the signal.

The SINR refers to a ratio of strength of a received useful signal to strength of a received interference signal (noise and interference), and may be simply understood as a "signal-to-noise ratio". The SINR may reflect the transmission quality of the signal to a certain extent. Therefore, the terminal device measures the SINR of the signal and reports it to the network device, being beneficial for the network device to find the best signal to communicate with the terminal device.

The larger the SINR value of a signal, the better the transmission quality of the signal.

Optionally, the measurement quantity may be the RSRQ, or the SINR, or both the RSRQ and the SINR.

In addition, the measurement quantity may also include RSRP in addition to above RSRQ and/or SINR.

In step 220, the terminal device reports the measurement quantities of the K signals to the network device.

Technical solutions provided by an implementation of the present disclosure may take the RSRQ and/or the SINR of the signal as measurement quantities, and the RSRQ and/or the SINR may reflect the quality of the signal to a certain extent. The terminal device may measure the RSRQ and/or the SINR of K signals and report them to the network device, being beneficial for the network device to find the best signal to communicate with terminal device.

Figure 3:
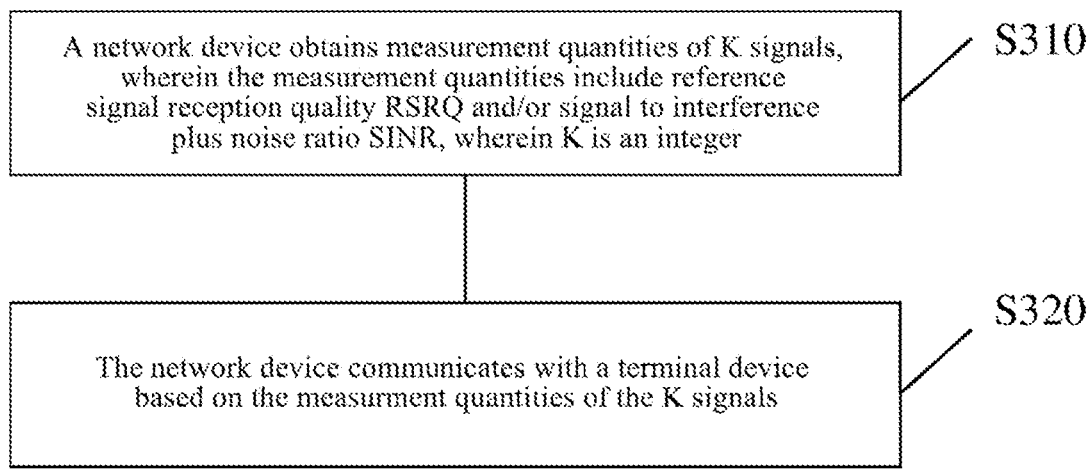
FIG. 3 is a schematic block diagram of a method for determining measurement quantities provided by an implementation of the present disclosure.

FIG. 3 is a method for determining measurement quantities provided by an implementation of the present disclosure, and the method in FIG. 3 includes at least part of following contents.

In step 310, a network device obtains measurement quantities of K signals, wherein the measurement quantities include reference signal reception quality RSRQ and/or signal to interference plus noise ratio SINR, and K is a positive integer.

In step 320, the network device communicates with a terminal device based on the measurement quantities of the K signals.

Technical solutions provided by implementations of the present disclosure may take the RSRQ and/or the SINR of the signal as measurement quantities, and the RSRQ and/or the SINR may reflect the quality of the signal to a certain extent. After receiving the measurement quantity reported by the terminal device, the network device may easily find a best signal to communicate with the terminal device.

A way in which the terminal device reports the measurement quantity corresponds to a way in which the network device determines the measurement quantity, and these two ways will be described together below.

It should be understood that some specific descriptions of the ways in which the terminal device reports measurement quantity may also be adaptively applied to a process of determining measurement quantity by the network device, and some specific descriptions of determining measurement quantity by the network device may also be adaptively applied to a process of reporting measurement quantity by the terminal device.

There are various ways for the terminal device to report the measurement quantities of K signals to the network device, and step 220 is described in detail below.

As an example, the terminal device may directly report a bit value corresponding to a measurement quantity of each signal of the K signals to the network device according to a corresponding relationship between the measurement quantities and the bit values. Herein, the bit values are values which are represented by bits.

In this way, the terminal device only needs to look up a corresponding relationship table between the measurement quantities and the bit values, and report the bit value corresponding to the measurement quantity to the network device. For the terminal device, this reporting mode is relatively simple, and a processing process is relatively simple.

For the network device, after receiving the bit values corresponding to the measurement quantities of the K signals reported by the terminal device, the measurement quantities of the K signals may be determined according to the corresponding relationship table between the measurement quantities and the bit values, so as to find out the best signal to communicate with the terminal device.

When the measurement quantity is the SINR, an interval corresponding to the bit values in the corresponding relationship is 0.25 dB, and/or a number of the bit values corresponding to the SINR is 128, that is, there are 128 values indicated through the bits.

Or, when the measurement quantity is the SINR, in the corresponding relationship between the measurement quantities and the bit values, the interval of the SINR corresponding to the bit values is 0.5 dB, and/or a number of the bit values corresponding to the SINR is 128. Following is an example with an interval of 0.5 dB.

Specifically, when the measurement quantity is the SINR, there may be multiple corresponding relationships between the measurement quantity and the bit value. For example, in the corresponding relationships between the measurement quantity and the bit value, the interval of the SINR corresponding to the bit values may be 0.5 dB, that is, the SINR values may correspond to different bit values at intervals of 0.5 dB, and a range of corresponding bit values may be not limited. For another example, the bit value corresponding to the SINR may be a positive integer greater than or equal to 0 and less than or equal to 128, and an interval of SINR corresponding to a specific bit value may be not limited. For another example, the interval of the SINR corresponding to the bit values may be 0.5 dB, and the number of the bit values corresponding to the SINR is 128.

The corresponding relationship between the SINRs and the bit values may be agreed in advance by the terminal device and the network device, or the corresponding relationship may be indicated to the terminal device by the network device through high-level signaling. Or the corresponding relationship may also be a predefined corresponding relationship, for example, the corresponding relationship is a corresponding relationship specified in standard specifications.

The corresponding relationship between the SINRs and the bit values as shown in Table 1 is taken as an example to describe below.

In the corresponding relationship between the SINRs and the bit values shown in Table 1, the interval of the SINRs corresponding to the bit values may be 0.5 dB, and the number of the bit values corresponding to the SINRs is 128.

The corresponding relationship between the SINRs and the bit values shown in Table 1 altogether describes 128 ranges of the SINR, wherein each signal of the 128 ranges may correspond to a bit value, and the 128 ranges may be expressed by 7 bits. Therefore, when the terminal device reports the SINR of each signal, it needs to occupy 7 bits to report.

Therefore, when the terminal device reports the measurement quantities of K signals in a way of Table 1, it needs to occupy 7*K bits to report.

TABLE 1

| Representation of reported bit values | Measurement quantity and conditions | Unit |
|---|---|---|
| SINR_000. | SINR < −23 | dB |
| SINR_001. | −23 ≤ SINR < −22.5 | dB |
| . . . | . . . | . . . |
| SINR_126. | 39.5 ≤ SINR < 40 | dB |
| SINR_127. | 40 ≤ SINR | dB |

It should be noted that the "Representation of reported bit values" shown in Table 1 is only a sequence number and does not represent an actual reported bit value. Bit values in an actual corresponding relationship table may be a corresponding relationship from 0 to 127 arranged in an order from large to small, a corresponding relationship from 0 to 127 arranged in an order from small to large, or any one kind of corresponding relationship.

When the measurement quantity is the RSRQ, the corresponding relationship between the measurement quantities and the bit values may be above corresponding relationship between the SINR and the bit value. For example, in the corresponding relationship between the RSRQs and the bit values, an interval of the RSRQs corresponding to the bit values is 0.5 dB, and/or a number of bit values corresponding to RSRQ is 128. Specific corresponding relationship table may be referred to above description of Table 1.

When the measurement quantity is the RSRQ, in the corresponding relationship between the RSRQs and the bit values, the interval of RSRQs corresponding to bit values is 0.25 dB, and/or the number of bit values corresponding to the RSRQ is 128.

When the measurement quantity is the RSRQ, in the corresponding relationship between the RSRQs and the bit values, the interval of the RSRQs corresponding to the bit values is 0.5 dB, and/or the bit value corresponding to the RSRQ is an integer greater than or equal to −30 and less than or equal to 46, and/or when the RSRQ is less than −34 dB, the RSRQ is expressed by a bit value, and/or when the RSRQ is greater than or equal to 2.5 dB, the RSRQ is expressed by a bit value. A specific corresponding relationship between the RSRQs and the bit values may be shown in Table 2.

TABLE 2

| Representation of reported bit values | Measurement quantity and conditions | Unit |
|---|---|---|
| RSRQ_−30. | RSRQ < −34 | dB |
| RSRQ_−29. | −34 ≤ RSRQ < −33.5 | dB |
| . . . | . . . | . . . |
| RSRQ_−02. | −20.5 ≤ RSRQ < −20 | dB |
| RSRQ_−01. | −20 ≤ RSRQ < −19.5 | dB |
| RSRQ_00. | RSRQ < −19.5 | dB |
| RSRQ_01. | −19.5 ≤ RSRQ < −19 | dB |
| RSRQ_02. | −19 ≤ RSRQ < −18.5 | dB |
| . . . | . . . | . . . |
| RSRQ_32. | −4 ≤ RSRQ < −3.5 | dB |
| RSRQ_33. | −3.5 ≤ RSRQ < −3 | dB |
| RSRQ_34. | −3 ≤ RSRQ | dB |
| RSRQ_35. | −3 ≤ RSRQ < −2.5 | dB |
| RSRQ_36. | −2.5 ≤ RSRQ < −2 | dB |
| . . . | . . . | . . . |
| RSRQ_45. | 2 ≤ RSRQ < 2.5 | dB |
| RSRQ_46. | 2.5 ≤ RSRQ | dB |

The corresponding relationship between the RSRQs and the bit values shown in Table 2 describes 77 value ranges of the RSRQ, wherein each signal of the 77 value ranges may correspond to a bit value, and the 77 value ranges may be represented by 7 bits. Therefore, when the terminal device reports the RSRQ of each signal, it needs to occupy 7 bits to report.

It should be noted that the "Representation of reported bit value" shown in Table 2 is only a sequence number and does not represent the actual reported bit value. The bit values in the actual corresponding relationship table may be a corresponding relationship from 0 to 76 arranged in an order from large to small, a corresponding relationship from 0 to 76 arranged in an order from small to large, or any one kind of corresponding relationship.

When the terminal device reports the measurement quantities of K signals in a way of Table 2, it needs to occupy 7*K bits to report.

Optionally, the corresponding relationship between the RSRQs and the bit values may be extended to more bits, or it may be a part of the corresponding relationship in Table 2.

For example, the corresponding relationship between the RSRQs and the bit values may be as shown in Table 3, and a corresponding relationship of Table 3 is a part of the corresponding relationship of Table 2.

TABLE 3

| Representation of reported bit values | Measurement quantity and conditions | Unit |
|---|---|---|
| RSRQ_00. | RSRQ < −19.5 | dB |
| RSRQ_01. | −19.5 ≤ RSRQ < −19 | dB |
| RSRQ_02. | −19 ≤ RSRQ < −18.5 | dB |
| . . . | . . . | . . . |
| RSRQ_32. | −4 ≤ RSRQ < −3.5 | dB |
| RSRQ_33. | −3.5 ≤ RSRQ < −3 | dB |
| RSRQ_34. | −3 ≤ RSRQ | dB |

The relationship between the RSRQs and the bit values shown in table 3 describes 35 value ranges of the RSRQ, wherein each signal of the 35 value ranges of the RSRQ may correspond to a bit value, and the 35 value ranges may be expressed by 6 bits. Therefore, when the terminal device reports the RSRQ of each signal, it needs to occupy 6 bits to report.

It should be noted that the "Representation of reported bit value" shown in Table 1 is only a sequence number and does not represent an actual reported bit value. The bit values in an actual corresponding relationship may be a corresponding relationship from 0 to 34 arranged in an order from large to small, a corresponding relationship from 0 to 34 arranged in an order from small to large, or any kind of corresponding relationship.

When the terminal device reports the measurement quantities of K signals in a way of Table 3, it needs to occupy 6*K bits to report.

The corresponding relationship between the RSRQs and the bit values may be agreed in advance by the terminal device and the network device, or the corresponding relationship may be indicated to the terminal device by the network device through high-level signaling, or the corresponding relationship may also be a predefined corresponding relationship, for example, a corresponding relationship specified in standard specifications.

It should be noted that Table 2 may be an extension of the corresponding relationship between the measurement quantity and the bit value shown in Table 3. When the corresponding relationship shown in Table 2 is adopted, for two corresponding relationships of RSRQ<19.5 dB and −3 dB≤RSRQ in Table 2, an implementation of the present disclosure may configure these two corresponding relationships, that is, the two corresponding relationships may be retained in a corresponding relationship table. Or these two corresponding relationships are not configured, that is, the two corresponding relationships may not be retained in the corresponding relationship table.

When these two corresponding relationships are retained, the corresponding relationship between the measurement quantities and the bit values may be as shown in Table 2. When the terminal device actually reports, if the measurement quantity is less than −19.5 dB, or the measurement quantity is greater than or equal to −3 dB, the terminal device may ignore the two corresponding relationships, find a bit value corresponding to the measurement quantity from other corresponding relationships, and report it to the network device.

When the two corresponding relationships are not retained, the corresponding relationship between the measurement quantities and the bit values may be a corresponding relationship after deleting the two corresponding relationships in Table 2. Or it may be a corresponding relationship obtained after deleting the two corresponding relationships and reordering the bit values. For example, in a reordered corresponding relationship table, when −20 dB≤RSRQ<−19.5 dB, the bit value is expressed as 0. When −20.5 dB≤RSRQ<−20 dB, the bit value is −1; . . . When RSRQ<−34 dB, the bit value is expressed as −29. When −3 dB≤RSRQ<−2.5 dB, the bit value is expressed as 34. When −2.5 dB≤RSRQ<−2 dB, the bit value is 35; . . . When 2.5 dB≤RSRQ, the bit value is expressed as 45.

It should be understood that in addition to the interval of the measurement quantities corresponding to the bit values being 0.25 dB or 0.5 dB, the interval of the measurement quantities corresponding to the bit values may also be 0.1 dB, 0.75 dB or 1 dB, etc.

In order to reduce a number of bits occupied by reporting the measurement quantity and save signaling overhead, the terminal device may report part signals of the K signals in the ways shown in Table 1-Table 3, and report remaining signals in other ways. Specific solution is as follows.

As another example, the terminal device may report a bit value corresponding to measurement quantity of each signal of M signals among K signals to the network device according to the corresponding relationship between the measurement quantities and the bit values, wherein M is a positive integer and K>M.

Implementations of the present disclosure do not specifically limit a determination mode of M signals. For example, the M signals may be any K signals among the K signals. For another example, the M signals may be M signals whose values of the measurement quantity are maximum among the K signals. For another example, the M signals may be M signals whose values of the measurement quantity are minimum among the K signals. For another example, the M signals are M signals whose values of the measurement quantities are located in middle among the K signals.

When the measurement quantity is the SINR, the terminal device may report the measurement quantity of each signal of the M signals in the K signals in a way shown in Table 1, and a specific reporting may refer to above description. Reporting the measurement quantity of the M signals needs to occupy 7*M bits.

When the measurement quantity is the RSRQ, the terminal device may report the measurement quantity of each signal of the M signals in the K signals in a way shown in Table 2, and a specific reporting way may refer to above description. Reporting the measurement quantity of the M signals needs to occupy 7*M bits.

Or, when the measurement quantity is the RSRQ, the terminal device may report the measurement quantity of each signal of the M signals in the K signals in a way shown in Table 3, and a specific reporting way may refer to above description. Reporting the measurement quantity of the M signals needs to occupy 6*M bits.

There are multiple ways for the terminal device to report remaining (K−M) signals, and the terminal device may determine a bit value corresponding to measurement quantity of each signal of the (K−M) signals according to measurement quantities of at least some of the M signals and measurement quantities of the (K−M) signals. Then, the terminal device reports the bit value corresponding to the measurement quantity of each signal of the (K−M) signals to the network device.

As an implementation mode, the terminal device may generate a difference corresponding to the measurement quantity of each signal of the (K−M) signals in a differential manner according to the measurement quantities of at least part of the M signals and the measurement quantities of the (K−M) signals. Then, the terminal device may determine a bit value corresponding to a difference of the measurement quantity of each signal of the (K−M) signals according to a corresponding relationship between the differences and the bit values, and report the bit value corresponding to the difference of the measurement quantity of each signal of the (K−M) signals to the network device.

For the network device, after receiving the bit values corresponding to the difference of the (K−M) signals reported by terminal device, the difference of the measurement quantities of the (K−M) signals may be determined according to the corresponding relationship between the differences and the bit values. Then the measurement quantities of the (K−M) signals may be determined in a differential manner according to the measurement quantities of at least part of the M signals.

There are multiple ways for the terminal device to generate the difference corresponding to the measurement quantity of each signal of the (K−M) signals.

For example, the terminal device may respectively differentiate between the measurement quantities of the (K−M) signals and measurement quantity of one signal of the M signals to obtain a difference of the measurement quantity of each signal of the (K−M) signals.

The terminal device may perform a differential operation on the (K−M) signals based on any one signal of the M signals to obtain the difference between the measurement quantity of each signal of the (K−M) signals and the measurement quantity of any one signal of the M signals.

Any one signal of the M signals may be a signal whose measurement quantity is maximum among the M signals, a signal whose measurement quantity is minimum among the M signals, or a signal whose measurement quantity is located in a middle position among the M signals.

In implementations of the present disclosure, which of a signal whose measurement quantity is maximum among the M signals, a signal whose measurement quantity is minimum among the M signals, or a signal whose measurement quantity is located in a middle position among the M signals is selected may be according to a distribution situation of actual measurement quantities.

Preferably, after a measurement quantity of a signal selected from the M signals is made difference with the (K−M) signals, obtained differences of the measurement quantities of the (K−M) signals may mainly fall within a dynamic range of the differences.

For another example, the terminal device may differentiate a measurement quantity of an ith signal of the (K−M+1) signals and a measurement quantity of an (i−1) th signal of the (K−M+1) signals to generate a difference of the measurement quantity of the ith signal, wherein i={2, 3, . . . , K−M+1}, the (K−M+1) signals include (K−M) signals in addition to M signals of K signals, and one signal of the M signals, and a first signal of (K−M+1) signals is the one signal of the M signals.

For the network device, a difference is made between the measurement quantity of the i-th signal with the measurement quantities of the (i−1) th signal of the (K−M+1) signals to generate the measurement quantity of the i-th signal, wherein i={2, 3, . . . , K−M+1}, the (K−M+1) signals include (K−M) signals and one signal of the M signals, and the first signal of (K−M+1) signals is the one signal of the M signals.

It should be understood that the (K−M) signals are (K−M) signals included in a second signal to a (K−M+1) th signal of the (K−M+1) signals. A difference of the measurement quantity of each signal of the (K−M) signals may be obtained by obtaining a difference of measurement quantities of the second signal to the (K−M+1) th signal.

Any one signal of the M signals may be a signal whose measurement quantity is maximum among the M signals, a signal whose measurement quantity is minimum among the M signals, or a signal whose measurement quantity is located in a middle position among the M signals.

Specifically, the terminal device may take any one of the M signals as a reference and take one of the M signals as the first signal. The (K−M) signals are a second, a third, . . . and a (K−M+1) th signal in turn.

The difference of the measurement quantity of the i-th signal is a difference between a measurement quantity of the i-th signal and a measurement quantity of the (i−1)th signal. Therefore, the terminal device may obtain the difference of the measurement quantity of each signal of the (K−M) signals in this way.

Before the terminal device differentiate the measurement quantity of the ith signal of the (K−M+1) signals with the measurement quantity of the (i−1)th signal of the (K−M+1) signals to generate the difference of the measurement quantity of the ith signal, the terminal device may order the (K−M) signals according to a value of the measurement quantity.

For example, the measurement quantities of the (K−M) signals may be ordered in an order from large to small, or may be ordered in an order from small to large.

Ordering first and then making difference to the (K−M) signals may show advantages and disadvantages of the (K−M) signals more intuitively. After receiving the measurement quantity reported by the terminal device, the network device may more easily distinguish signal quality, being beneficial for the network device to determine the best signal to communicate with the terminal device.

There are multiple corresponding relationships between the difference and the bit value, which will be described in detail below.

For example, an interval of a difference corresponding to one bit value may be 2 dB, and/or the bit value corresponding to the difference may be an integer greater than or equal to 0 and less than or equal to 15. Specific corresponding relationship may be shown in Tables 4 to Table 7.

When the difference is less than 2 dB, the bit value is 0. When the difference is greater than or equal to 30 dB, the bit value is 15. Specific corresponding relationships may be shown in Table 4. After the terminal device obtains the difference of the measurement quantity of the signal in above-described way, it may look up the bit value corresponding to the difference according to Table 4, and report the bit value corresponding to the difference to the network device.

TABLE 4

| Representation of reported bit values | Difference and condition | Unit |
|---|---|---|
| 00. | Difference < 2 | dB |
| 01. | 2 ≤ difference < 4 | dB |
| ... | ... | ... |
| 14. | 28 ≤ difference < 30 | dB |
| 15. | 30 ≤ difference | dB |

When the difference is less than or equal to 2 dB, the bit value is 0. When the difference is greater than 30 dB, the bit value is 15. Specific corresponding relationships may be shown in Table 5. After the terminal device obtains the difference of the measurement quantity of the signal in above-described way, it may look up the bit value corresponding to the difference according to Table 5, and report the bit value corresponding to the difference to the network device.

TABLE 5

| Representation of reported bit values | Difference and condition | Unit |
|---|---|---|
| 00. | Difference ≤ 2 | dB |
| 01. | 2 < difference ≤ 4 | dB |
| ... | ... | ... |
| 14. | 28 < difference ≤ 30 | dB |
| 15. | 30 < difference | dB |

When the difference is less than 2 dB, the bit value is 15. When the difference is greater than or equal to 30 dB, the bit value is 0. Specific corresponding relationships may be shown in Table 6. After the terminal device obtains the difference of the measurement quantity of the signal in above-described way, it may look up the bit value corresponding to the difference according to Table 6, and report the bit value corresponding to the difference to the network device.

TABLE 6

| Representation of reported bit values | Difference and condition | Unit |
|---|---|---|
| 15. | Difference < 2 | dB |
| 14. | 2 ≤ difference < 4 | dB |
| ... | ... | ... |
| 01. | 28 ≤ difference < 30 | dB |
| 00. | 30 ≤ difference | dB |

When the difference is less than or equal to 2 dB, the bit value is 15. When the difference is greater than 30 dB, the bit value is 0. Specific corresponding relationships may be shown in Table 7. After the terminal device obtains the difference of the measurement quantity of the signal in above-described way, it may look up the bit value corresponding to the difference according to Table 7, and report the bit value corresponding to the difference to the network device.

TABLE 7

| Representation of reported bit values | Difference and condition | Unit |
|---|---|---|
| 15. | Difference ≤ 2 | dB |
| 14. | 2 < difference ≤ 4 | dB |
| ... | ... | ... |
| 01. | 28 < difference ≤ 30 | dB |
| 00. | 30 < difference | dB |

In corresponding relationships between the difference and the bit value shown in Table 4 to Table 7, 16 value ranges of the difference are described, wherein each value range of the 16 value ranges may correspond to a bit value, and the 16 value ranges may be expressed by 4 bits. Therefore, when the terminal device reports the difference of the measurement quantity of a signal in any way shown in Table 4 to Table 7, it needs to occupy 4 bits to report. Therefore, when the terminal device reports (K−M) signals in any way shown in Table 4 to Table 7, it needs to occupy 4*(K−M) bits. When the terminal device reports M signals in a way of Table 1 and reports (K−M) signals in a way shown in Tables 4 to Table 7, it needs to occupy 7*M+4*(K−M) bits in total. Compared with a way that reporting K signals in a way of Table 1 or Table 2 needs to occupy 7*K bits, it may save resources and reduce signaling overhead.

In the corresponding relationship between the differences and the bit values shown in Table 4 to Table 7, the interval of the difference corresponding to the bit value is all 2 dB. Implementations of the present disclosure provide another corresponding relationship, which may reduce the interval of the difference corresponding to the bit value and improve accuracy of the measurement quantity reported by terminal device.

Specifically, the interval of the difference corresponding to the bit value may be 1 dB, and/or the bit value corresponding to the difference is an integer greater than or equal to 0 and less than or equal to 15.

A detailed description is made with reference to corresponding relationship between differences and bit values shown in Table 8 to Table 11 below.

When the difference is less than 1 dB, the bit value is 0. When the difference is greater than or equal to 15 dB, the bit value is 15. Specific corresponding relationships may be shown in Table 8. After the terminal device obtains the difference of the measurement quantity of the signal in above-described way, it may look up the bit value corresponding to the difference according to Table 8, and report the bit value corresponding to the difference to the network device.

TABLE 8

| Representation of reported bit values | Difference and condition | Unit |
|---|---|---|
| 00. | Difference < 1 | dB |
| 01. | 1 ≤ difference < 2 | dB |
| ... | ... | ... |
| 14. | 14 ≤ difference < 15 | dB |
| 15. | 15 ≤ difference | dB |

When the difference is less than or equal to 1 dB, the bit value is 0. When the difference is greater than 15 dB, the bit value is 15. Specific corresponding relationships may be shown in Table 9. After the terminal device obtains the difference of the measurement quantity of the signal in above-described way, it may look up the bit value corresponding to the difference according to Table 9, and report the bit value corresponding to the difference to the network device.

TABLE 9

| Representation of reported bit values | Difference and condition | Unit |
|---|---|---|
| 00. | Difference ≤ 1 | dB |
| 01. | 1 < difference ≤ 2 | dB |
| ... | ... | ... |

TABLE 9-continued

| Representation of reported bit values | Difference and condition | Unit |
|---|---|---|
| 14. | 14 < difference ≤ 15 | dB |
| 15. | 15 < difference | dB |

When the difference is less than 1 dB, the bit value is 15. When the difference is greater than or equal to 15 dB, the bit value is 0. Specific corresponding relationships may be shown in Table 10. After the terminal device obtains the difference of the measurement quantity of the signal in above-described way, it may look up the bit value corresponding to the difference according to Table 10 and report the bit value corresponding to the difference to the network device.

TABLE 10

| Representation of reported bit values | Difference and condition | Unit |
|---|---|---|
| 15. | Difference < 1 | dB |
| 14. | 1 ≤ difference < 2 | dB |
| ... | ... | ... |
| 01. | 14 ≤ 差值 < 15 | dB |
| 00. | 15 ≤ difference | dB |

When the difference is less than or equal to 1 dB, the bit value is 15. When the difference is greater than 15 dB, the bit value is 0. Specific corresponding relationships may be shown in Table 11. After the terminal device obtains the difference of the measurement quantity of the signal in above-described way, it may look up the bit value corresponding to the difference according to Table 11 and report the bit value corresponding to the difference to the network device.

TABLE 11

| Representation of reported bit values | Difference and condition | Unit |
|---|---|---|
| 15. | Difference ≤ 1 | dB |
| 14. | 1 < difference ≤ 2 | dB |
| ... | ... | ... |
| 01. | 14 < difference ≤ 15 | dB |
| 00. | 15 < difference | dB |

Ways shown in Table 8 to Table 11 respectively describe 16 value ranges of the difference, and the terminal device only needs 4 bits to report the difference of the measurement quantity of each signal, which may save signaling overhead.

When reporting in the ways shown in Table 8 to Table 11, a step size of the difference may be reduced, and the accuracy of the measurement quantity reported by the terminal device may be improved. However, a dynamic range of the difference is only in a range of 1 dB-15 dB, and the dynamic range is small. Therefore, implementations of the present disclosure propose another corresponding relationship, which may ensure reporting accuracy of the terminal device without affecting a dynamic value range of the difference.

Specifically, the interval of the difference corresponding to the bit value may be 1 dB, and/or the bit value corresponding to the difference may be an integer greater than or equal to 0 and less than or equal to 31.

A detailed description is made with reference to corresponding relationship between differences and bit values shown in Table 8 to Table 12 to Table 15 below.

When the difference is less than 1 dB, the bit value is 0. When the difference is greater than or equal to 31 dB, the bit value is 31. The specific corresponding relationship may be shown in Table 12. After the terminal device obtains the difference of the measurement quantity of the signal in above-described way, it may look up the bit value corresponding to the difference according to Table 12 and report the bit value corresponding to the difference to the network device.

TABLE 12

| Representation of reported bit values | Difference and condition | Unit |
|---|---|---|
| 00. | Difference < 1 | dB |
| 01. | 1 ≤ difference < 2 | dB |
| ... | ... | ... |
| 30. | 30 ≤ difference < 31 | dB |
| 31. | 31 ≤ difference | dB |

When the difference is less than or equal to 1 dB, the bit value is 0. When the difference is greater than 31 dB, the bit value is 31. The specific corresponding relationship may be shown in Table 13. After the terminal device obtains the difference of the measurement quantity of the signal in above-described way, it may look up the bit value corresponding to the difference according to Table 13 and report the bit value corresponding to the difference to the network device.

TABLE 13

| Representation of reported bit values | Difference and condition | Unit |
|---|---|---|
| 00. | Difference ≤ 1 | dB |
| 01. | 1 < difference ≤ 2 | dB |
| ... | ... | ... |
| 30. | 30 < difference ≤ 31 | dB |
| 31. | 31 < difference | dB |

When the difference is less than 1 dB, the bit value is 31. When the difference is greater than or equal to 31 dB, the bit value is 0. The specific corresponding relationship may be shown in Table 14. After the terminal device obtains the difference of the measurement quantity of the signal in above-described way, it may look up the bit value corresponding to the difference according to Table 14 and report the bit value corresponding to the difference to the network device.

TABLE 14

| Representation of reported bit values | Difference and condition | Unit |
|---|---|---|
| 31. | Difference < 1 | dB |
| 30. | 1 ≤ difference < 2 | dB |
| ... | ... | ... |
| 01. | 30 ≤ difference < 31 | dB |
| 00. | 31 ≤ difference | dB |

When the difference is less than or equal to 1 dB, the bit value is 31. When the difference is greater than 31 dB, the bit value is 0. The specific corresponding relationship may be shown in Table 15. After the terminal device obtains the difference of the measurement quantity of the signal in above-described way, it may look up the bit value corresponding to the difference according to Table 15 and report the bit value corresponding to the difference to the network device.

TABLE 15

| Representation of reported bit values | Difference and condition | Unit |
|---|---|---|
| 31. | Difference ≤ 1 | dB |
| 30. | 1 < difference ≤ 2 | dB |
| ... | ... | ... |
| 01. | 30 < difference ≤ 31 | dB |
| 00. | 31 < difference | dB |

In the corresponding relationship between the differences and the bit values shown in Table 12 to Table 15 show, 32 value ranges of difference are described, wherein each value range of the 32 value ranges may correspond to a bit value, and the 32 value ranges may be expressed by 5 bits. Therefore, when the terminal device reports the difference of the measurement quantity of the signal in any way shown in Table 12 to Table 15, it needs to occupy 5 bits to report.

Compared with a way that all K signals are reported according to the bit value corresponding to the measurement quantity, some of the K signals are reported according to the difference of the measurement quantity of the signal, which may reduce bits occupied by reporting the measurement quantity and save signaling overhead.

In addition, in implementations of the present disclosure, besides differentiating the measurement quantities of the (K−M) signals from the measurement quantity of one signal of the M signals described above, the measurement quantities of the (K−M) signals may also be differentiated from the measurement quantities of multiple signals of the M signals. For example, the measurement quantities of the (K−M) signals may be differentiated from an average value of the measurement quantities of multiple signals of the M signals. A specific difference method is not limited in implementations of the present disclosure implementation.

It should be understood that, in addition to 1 dB and 2 dB, the interval of the difference corresponding to the bit value also may be 0.25 dB, 0.5 dB, 0.75 dB and other intervals.

The corresponding relationship between the differences and the bit values may be agreed in advance between the terminal device and the network device. Or the corresponding relationship may be indicated by the network device to the terminal device through high-level signaling. Or the corresponding relationship may be a predefined corresponding relationship. For example, the corresponding relationship is specified in standard specifications.

Above is only exemplified in a differential manner, and at least part of the M signals may also be calculated in other ways. For example, the terminal device may generate a ratio corresponding to the measurement quantity of each signal of the (K−M) signals according to the measurement quantities of at least some of the M signals and the measurement quantities of the (K−M) signals in a division manner. Then, the terminal device may report the bit value corresponding to a ratio of the measurement quantity of each signal of the (K−M) signals to the network device according to the corresponding relationship between the ratios and the bit values.

Optionally, the terminal device may measure the measurement quantities of N signals, select K signals from the N signals, and report the measurement quantities of the K signals.

The measurement quantities of K signals are measurement quantities of K signals whose value of the measurement quantities are maximum among the N signals, and/or the measurement quantity of each signal of the K signals is larger than a preset threshold, wherein N is a positive integer and N≥K.

Specifically, the K signals may be K signals whose values of the measurement quantities are largest among the N signals, or any K signals whose measurement quantities are larger than a preset threshold value among the N signals, or K signals whose measurement quantities are larger than a preset threshold value and whose values of the measurement quantities are largest among the N signals.

Optionally, the K signals may be carried on K beams. For example, one signal is carried on each beam.

After determining a best signal, the network device may find a best beam to communicate with the terminal device according to a corresponding relationship between the signals and the beams.

Optionally, the K signals may include SSB and/or CSI-RS. For example, all the K signals may be SSBs, or all the K signals are CSI-RSs, or some of the K signals are SSBs and some are CSI-RSs.

Optionally, the terminal device also may report indexes of the K signals to the network device while reporting the measurement quantities of the K signals. In this way, after receiving the measurement quantities and indexes of the K signals reported by the terminal device, the network device may know a signal corresponding to each measurement quantity, being beneficial for the network device to select the best signal to communicate with the terminal device.

Optionally, before determining the measurement quantities of the K signals, the terminal device may receive configuration information sent by the network device, wherein the configuration information is used for indicating information of measurement quantities that the terminal device needs to measure.

For example, the configuration information may indicate that the terminal device only needs to measure the SINR of the signal, or that the terminal device only needs to measure the RSRQ of the signal, or that the terminal device needs to measure the SINR and the RSRQ of the signal.

It should be noted that the configuration information may also indicate that the terminal device measures the RSRP of the signal. Specifically, the RSRP may be reported in a traditional way, or in any way described above.

Optionally, the configuration information may send different configuration information for different terminal devices. For example, for newly joined terminal devices, the configuration information may indicate that the terminal device measures the SINR and/or the RSRQ of the signal. For old terminal devices, the configuration information may indicate that the terminal device measures the RSRP of the signal.

Optionally, the SINR mentioned in the present disclosure is an SINR of layer 1 (L1), that is, L1-SINR. The RSRQ is L1-RSRQ.

It should be noted that the corresponding relationships shown in Table 1 to Table 15 are only a specific implementation mode of implementations of the present disclosure, and will not limit implementations of the present disclosure. Any corresponding relationship obtained by deforming on this basis is within a protection scope of the present disclosure.

The method for reporting measurement quantities according to implementations of the present disclosure have been described in detail above. A device for reporting measurement quantities according to implementations of the present disclosure will be described below with reference to FIG. 4 to FIG. 8. Technical features described in method implementations are applicable to following device implementations.

Figure 4:
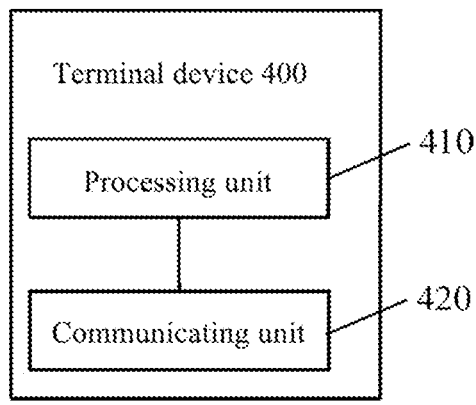
FIG. 4 is a schematic block diagram of a terminal device provided by an implementation of the present disclosure.

FIG. 4 is a schematic block diagram of a terminal device provided by an implementation of the present disclosure. The terminal device 400 of FIG. 4 includes a processing unit 410 and a communicating unit 420.

The processing unit 410 is configured to determine measurement quantities of K signals, wherein the measurement quantities include reference signal reception quality RSRQ and/or signal to interference plus noise ratio SINR.

The communicating unit 420 is configured to report the measurement quantities of the K signals to a network device, wherein K is a positive integer.

Optionally, the processing unit 410 is further configured to determine a bit value corresponding to the measurement quantity of each signal of M signals among the K signals according to a corresponding relationship between the measurement quantities and the bit values. The communicating unit 420 is specifically configured to report the bit value corresponding to the measurement quantity of each signal of the M signals among the K signals to the network device, wherein M is a positive integer and K>M.

Optionally, the M signals are M signals whose values of the measurement quantities are maximum among the K signals.

Optionally, the M signals are M signals whose values of the measurement quantities are minimum among the K signals.

Optionally, the processing unit 410 is specifically configured to, according to measurement quantities of at least some signals of the M signals and measurement quantities of (K−M) signals, determine the bit value corresponding to the measurement quantity of each signal of the (K−M) signals. The communicating unit 420 is specifically configured to report the bit value corresponding to the measurement quantity of each signal of the (K−M) signals to the network device.

Optionally, the processing unit 410 is specifically configured to generate a difference of the measurement quantity of each signal of the (K−M) signals in a differential manner according to the measurement quantities of at least some signals of the M signals and the measurement quantities of the (K−M) signals; according to a corresponding relationship between the differences and the bit values, determine the bit value corresponding to the difference of the measurement quantity of each signal of the (K−M) signals; And determine the bit value corresponding to the difference of the measurement quantity of each signal of the (K−M) signals as the bit value corresponding to the measurement quantity of each signal of the (K−M) signals.

Optionally, the processing unit 410 is specifically configured to differentiate the measurement quantities of the (K−M) signals with the measurement quantity of one signal of the M signals respectively, and generate the difference of the measurement quantities of each signal of the (K−M) signals.

Optionally, the processing unit 410 is specifically configured to differentiate a measurement quantity of an ith signal of (K−M+1) signal with a measurement quantity of the (i−1)th signal of (K−M+1) signals to generate a difference of the measurement quantity of the ith signal, wherein i={2, 3, . . . , K−M+1}, the (K−M+1) signals include (K−M) signals and one signal of the M signals, and a first signal of the (K−M+1) signals is the one signal of the M signals.

Optionally, the processing unit 410 is further configured to order the (K−M) signals according to the measurement quantities.

Optionally, in the corresponding relationship between the differences and the bit values, an interval of the difference corresponding to the bit value is 2 dB, and/or the bit value corresponding to the difference is an integer greater than or equal to 0 and less than or equal to 15.

Optionally, when the difference is less than 2 dB, the bit value is 0; and when the difference is greater than or equal to 30 dB, the bit value is 15. Or when the difference is less than or equal to 2 dB, the bit value is 0; and when the difference is greater than 30 dB, the bit value is 15. Or when the difference is less than 2 dB, the bit value is 15; and when the difference is greater than or equal to 30 dB, the bit value is 0. Or when the difference is less than or equal to 2 dB, the bit value is 15; and when the difference is greater than 30 dB, the bit value is 0.

Optionally, in the corresponding relationship between the differences and the bit values, an interval of the difference corresponding to the bit value is 1 dB, and/or the bit value corresponding to the difference is an integer greater than or equal to 0 and less than or equal to 15.

Optionally, when the difference is less than 1 dB, the bit value is 0; and when the difference is greater than or equal to 15 dB, the bit value is 15. Or when the difference is less than or equal to 1 dB, the bit value is 0; and when the difference is greater than 15 dB, the bit value is 15. Or when the difference is less than 1 dB, the bit value is 15; and when the difference is greater than or equal to 15 dB, the bit value is 0. Or when the difference is less than or equal to 1 dB, the bit value is 15; and when the difference is greater than 15 dB, the bit value is 0.

Optionally, in the corresponding relationship between the difference and the bit value, an interval of the difference corresponding to the bit value is 1 dB, and/or the bit value corresponding to the difference is an integer greater than or equal to 0 and less than or equal to 31.

Optionally, when the difference is less than 1 dB, the bit value is 0; and when the difference is greater than or equal to 31 dB, the bit value is 31. Or when the difference is less than or equal to 1 dB, the bit value is 0; and when the difference is greater than 31 dB, the bit value is 31. Or when the difference is less than 1 dB, the bit value is 31; and when the difference is greater than or equal to 31 dB, the bit value is 0. Or when the difference is less than or equal to 1 dB, the bit value is 31; and when the difference is greater than 31 dB, the bit value is 0.

Optionally, the communicating unit 420 is specifically configured to report the bit value corresponding to the measurement quantity of each signal of the K signals to the network device according to the corresponding relationship between the measurement quantities and the bit values.

Optionally, when the measurement quantity is the SINR, in the corresponding relationship between the measurement quantities and the bit values, an interval of the SINR corresponding to the bit value is 0.5 dB, and/or a number of the bit value corresponding to the SINR is 128, and/or when the SINR is less than −23 dB, it is expressed by one bit value, and/or when the SINR is greater than or equal to 40 dB, it is expressed by one bit value.

Optionally, when the measurement quantity is the RSRQ, an interval of RSRQ corresponding to bit value is 0.5 dB, and/or a number of the bit value corresponding to the RSRQ is 77, and/or when the RSRQ is less than −34 dB, it is expressed by one bit value, and/or when the RSRQ is greater than or equal to 2.5 dB, it is expressed by one bit value.

Optionally, when the measurement quantity is the RSRQ, the interval of the RSRQ corresponding to bit value is 0.5 dB, and/or the number of the bit value corresponding to the RSRQ is 35, and/or when the RSRQ is less than −19.5 dB, it is expressed by one bit value, and/or when the RSRQ is greater than or equal to −3 dB, it is expressed by one bit value.

Optionally, when the measurement quantity is the RSRQ, in the corresponding relationship between the measurement quantities and the bit values, the interval of the RSRQ corresponding to the bit value is 0.5 dB, and/or the number of the bit value corresponding to the RSRQ is 128.

Optionally, when the measurement quantity is RSRQ, in the corresponding relationship between the measurement quantities and bit values, the interval of RSRQ corresponding to bit values is 0.25 dB, and/or the number of bit values corresponding to RSRQ is 128.

Optionally, the processing unit 410 is specifically configured to measure the measurement quantities of N signals, select measurement quantities of K signals from the measurement quantities of the N signals, wherein the measurement quantities of the K signals are measurement quantities of K signals whose measurement quantities are maximum among the N signals, and/or the measurement quantity of each signal of the K signals is greater than a preset threshold, wherein N is a positive integer and N≥K.

Optionally, the K signals are carried on K beams.

Optionally, one of the K signals is carried on one beam.

Optionally, the K signals include an SSB and/or a CSI-RS.

Optionally, the processing unit 410 is further configured to report indexes of the K signals to the terminal device.

Optionally, the processing unit 410 is further configured to receive configuration information sent by the network device, wherein the configuration information includes information of the measurement quantity needed to be measured by the terminal device.

Optionally, the SINR is L1-SINR and the RSRQ is L1-RSRQ.

Figure 5:
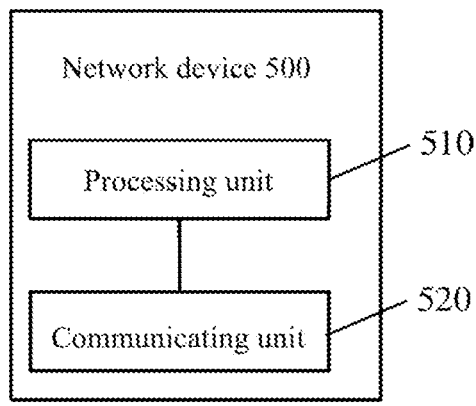
FIG. 5 is a schematic block diagram of a network device provided by an implementation of the present disclosure.

FIG. 5 is a schematic block diagram of a network device provided by an implementation of the present disclosure. The network device 500 of FIG. 5 includes a processing unit 510 and a communicating unit 520.

The processing unit 510 is configured to obtain measurement quantities of K signals, wherein the measurement quantities include RSRQ and/or SINR, and K is a positive integer.

The communicating unit 520 is configured to communicate with a terminal device based on the measurement quantities of the K signals.

Optionally, the processing unit 510 is specifically configured to obtain bit values corresponding to the measurement quantities of the K signals; and determine the measurement quantities of the K signals according to the bit values corresponding to the measurement quantities of the K signals.

Optionally, the processing unit 510 is specifically configured to determine the measurement quantity of each signal of M signals of the K signals according to the bit values corresponding to the measurement quantities of the K signals and a corresponding relationship between the measurement quantities and the bit values, wherein M is a positive integer and K>M.

Optionally, the M signals are M signals whose measurement quantity is maximum among the K signals.

Optionally, the M signals are M signals whose measurement quantity is minimum among the K signals.

Optionally, the processing unit 510 is specifically configured to, according to measurement quantities of at least some signals of the M signals and bit values corresponding to measurement quantities of (K−M) signals, determine a measurement quantity of each signal of the (K−M) signals.

Optionally, the processing unit 510 is specifically configured to: according to a bit value corresponding to differences of the (K−M) signals and a corresponding relationship between the differences and the bit values, determine a difference of the measurement quantity of each signal of the (K−M) signals; according to measurement quantities of at least some signals of the M signals and differences of the measurement quantities of the (K−M) signals, determine the measurement quantity of each signal of the (K−M) signals in a differential manner.

Optionally, the processing unit 510 is specifically configured to differentiate the difference of the measurement quantities of the (K−M) signals with the measurement quantity of one signal of the M signals respectively, and generate the measurement quantity of each signal of the (K−M) signals.

Optionally, the processing unit 510 is specifically configured to differentiate a difference of a measurement quantity of an ith signal of (K−M+1) signals with a measurement quantity of an (i−1)th signal of (K−M+1) signals to generate the measurement quantity of the ith signal, wherein i={2, 3, . . . , K−M+1}, the (K−M+1) signals include (K−M) signals and one signal of the M signals, and a first signal of (K−M+1) signals is the one signal of the M signals.

Optionally, in the corresponding relationship between the differences and the bit values, an interval of the difference corresponding to the bit value is 2 dB, and/or the bit value corresponding to the difference is an integer greater than or equal to 0 and less than or equal to 15.

Optionally, when the difference is less than 2 dB, the bit value is 0; and when the difference is greater than or equal to 30 dB, the bit value is 15. Or when the difference is less than or equal to 2 dB, the bit value is 0; and when the difference is greater than 30 dB, the bit value is 15. Or when the difference is less than 2 dB, the bit value is 15; and when the difference is greater than or equal to 30 dB, the bit value is 0. Or when the difference is less than or equal to 2 dB, the bit value is 15; and when the difference is greater than 30 dB, the bit value is 0.

Optionally, in the corresponding relationship between the differences and the bit values, an interval of the difference corresponding to the bit value is 1 dB, and/or the bit value corresponding to the difference is an integer greater than or equal to 0 and less than or equal to 15.

Optionally, when the difference is less than 1 dB, the bit value is 0; and when the difference is greater than or equal to 15 dB, the bit value is 15. Or when the difference is less than or equal to 1 dB, the bit value is 0; and when the difference is greater than 15 dB, the bit value is 15. Or when the difference is less than 1 dB, the bit value is 15; and when the difference is greater than or equal to 15 dB, the bit value is 0. Or when the difference is less than or equal to 1 dB, the bit value is 15; and when the difference is greater than 15 dB, the bit value is 0.

Optionally, in the corresponding relationship between the differences and the bit values, the interval of the difference corresponding to the bit value is 1 dB, and/or the bit value corresponding to the difference is an integer greater than or equal to 0 and less than or equal to 31.

Optionally, when the difference is less than 1 dB, the bit value is 0; and when the difference is greater than or equal to 31 dB, the bit value is 31. Or when the difference is less than or equal to 1 dB, the bit value is 0; and when the difference is greater than 31 dB, the bit value is 31. Or when the difference is less than 1 dB, the bit value is 31; and when the difference is greater than or equal to 31 dB, the bit value is 0. Or when the difference is less than or equal to 1 dB, the bit value is 31; and when the difference is greater than 31 dB, the bit value is 0.

Optionally, the processing unit 510 is specifically configured to determine the measurement quantities of the K signals according to the bit values corresponding to the measurement quantities of the K signals and the corresponding relationship between the measurement quantities and the bit values.

Optionally, when the measurement quantity is the SINR, in the corresponding relationship between the measurement quantities and the bit values, an interval of the SINR corresponding to the bit value is 0.5 dB, and/or a number of the bit value corresponding to the SINR is 128, and/or when the SINR is less than −23 dB, it is expressed by one bit value, and/or when the SINR is greater than or equal to 40 dB, it is expressed by one bit value.

Optionally, when the measurement quantity is the RSRQ, an interval of RSRQ corresponding to the bit value is 0.5 dB, and/or a number of the bit value corresponding to the RSRQ is 77, and/or when the RSRQ is less than −34 dB, it is expressed by one bit value, and/or when the RSRQ is greater than or equal to 2.5 dB, it is expressed by one bit value.

Optionally, when the measurement quantity is the RSRQ, the interval of the RSRQ corresponding to the bit value is 0.5 dB, and/or the number of the bit value corresponding to the RSRQ is an integer greater than or equal to 0 and less than or equal to 34, and/or when the RSRQ is less than −19.5 dB, it is expressed by one bit value, and/or when the RSRQ is greater than or equal to −3 dB, it is expressed by one bit value.

Optionally, when the measurement quantity is the RSRQ, in the corresponding relationship between the measurement quantities and the bit values, the interval of the RSRQ corresponding to the bit value is 0.5 dB, and/or the number of the bit value corresponding to the RSRQ is 128.

Optionally, when the measurement quantity is RSRQ, in the corresponding relationship between the measurement quantities and bit values, the interval of RSRQ corresponding to bit values is 0.25 dB, and/or the number of bit values corresponding to RSRQ is 128.

Optionally, the K signals are carried on K beams.

Optionally, one of the K signals is carried on one beam.

Optionally, the communicating unit 520 is further configured to receive indexes of the K signals reported by the terminal device.

Optionally, the communicating unit 520 is further configured to send configuration information to the terminal device, wherein the configuration information includes information of a measurement quantity needed to be measured by the terminal device.

Optionally, the SINR is L1-SINR and the RSRQ is L1-RSRQ.

Figure 6:
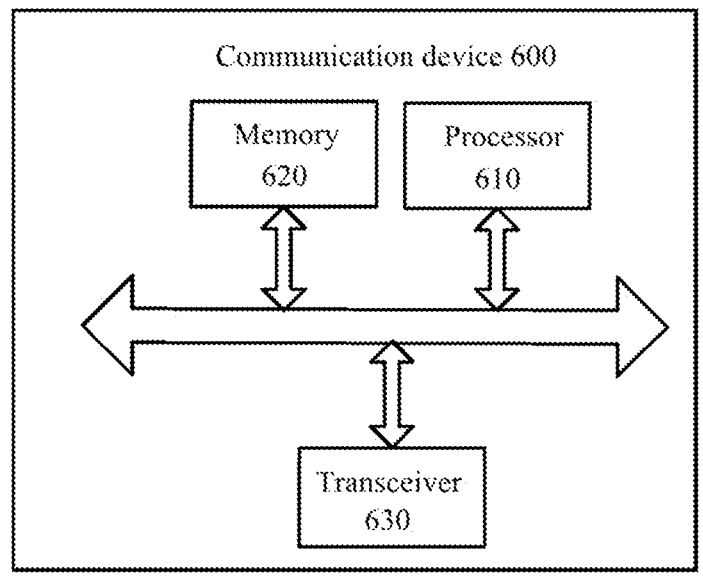
FIG. 6 is a schematic structural diagram of a communication device provided an implementation of the present disclosure.

FIG. 6 is a schematic structural diagram of a communication device 600 provided by an implementation of the present disclosure. The communication device 600 shown in FIG. 6 includes a processor 610. The processor 610 may call and run a computer program from a memory to implement a method in implementations of the present disclosure.

Optionally, as shown in FIG. 6, the terminal device 600 may further include a memory 620. The processor 610 may call and run a computer program from the memory 620 to implement a method in implementations of the present disclosure.

The memory 620 may be a separate device independent of the processor 610 or may be integrated in the processor 610.

Optionally, as shown in FIG. 6, the communication device 600 may further include a transceiver 630. The processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and a number of antennas may be one or more.

Optionally, the terminal device 600 may be a network device of implementations of the present disclosure, and the terminal device 600 may implement corresponding processes implemented by the network device in various methods of implementations of the present disclosure, which will not be repeated here for brevity.

Optionally, the communication device 600 may be specifically a mobile terminal/terminal device of implementations of the present disclosure, and the communication device 600 may implement corresponding processes implemented by the mobile terminal/terminal device in various methods of implementations of the present disclosure, which will not be repeated here for brevity.

Figure 7:
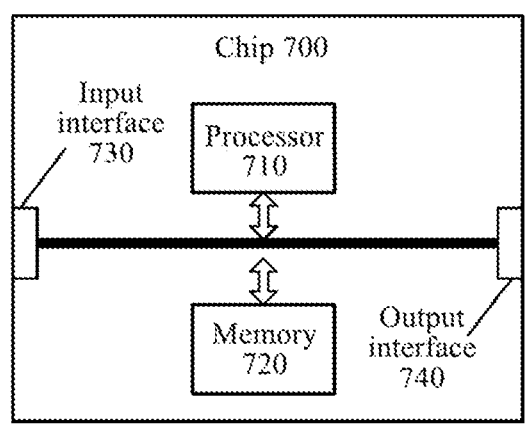
FIG. 7 is a schematic structural diagram of a chip provided by an implementation of the present disclosure.

FIG. 7 is a schematic structural diagram of a chip of an implementation of the present disclosure. A chip 700 shown in FIG. 7 includes a processor 710. The processor 710 may call and run a computer program from a memory to implement a method in implementations of the present disclosure.

Optionally, as shown in FIG. 7, the chip 700 may further include a memory 720. The processor 710 may call and run a computer program from the memory 720 to implement a method in implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the input interface 730 may obtain information or data sent by other devices or chips.

Optionally, the chip 700 may further include an output interface 740. The processor 710 may control the output interface 740 to communicate with other devices or chips. Specifically, the output interface 740 may output information or data to other devices or chips.

Optionally, the chip may be applied in a network device of implementations of the present disclosure, and the chip may implement corresponding processes implemented by the network device in various methods of implementations of the present disclosure, which will not be repeated here for brevity.

Optionally, the chip may be applied in a mobile terminal/terminal device of implementations of the present disclosure, and the chip may implement corresponding processes implemented by the mobile terminal/terminal device in various methods of implementations of the present disclosure, which will not be repeated here for brevity.

It should be understood that the chip mentioned in implementations of the present disclosure may be referred to as a system-level chip, a system chip, a chip system or a system-on-chip, etc.

Figure 8:
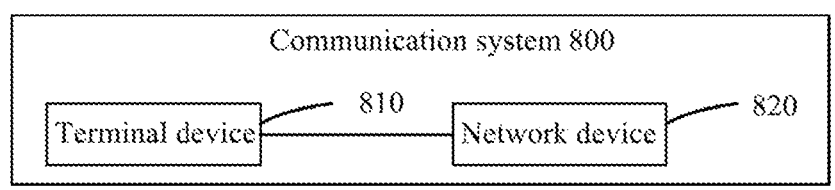
FIG. 8 is a schematic block diagram of a communication system provided by an implementation of the present disclosure.

FIG. 8 is a schematic block diagram of a communication system 800 provided by an implementation of the present disclosure. As shown in FIG. 8, the communication system 800 may include a terminal device 810 and a network device 820.

The terminal device 810 may be configured to implement corresponding functions implemented by a terminal device in above-mentioned method, and the network device 820 may be configured to implement corresponding functions implemented by a network device in above-mentioned method, which will not be repeated here for brevity.

It should be understood that, a processor in implementations of the present disclosure may be an integrated circuit chip having a signal processing capability. In an implementation process, each step of above method implementations may be implemented through an integrated logic circuit of hardware in the processor or instructions in a form of software. The processor may be a general purpose processor, a Digital Signal Processing (DSP), an Application Specific Integrated Circuit (ASIC), a Field Programmable Gate Array (FPGA) or other programmable logic devices, a discrete gate or a transistor logic device, or a discrete hardware component. Methods, steps and logical block diagrams disclosed in implementations of the present disclosure may be implemented or executed. The general purpose processor may be a microprocessor, or the processor may be any conventional processor, etc. Steps of the method disclosed with reference to implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads information in the memory and completes steps of above method in combination with its hardware.

It may be understood that, the memory in implementations of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. Through an exemplary but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described in this specification is intended to include, but is not limited to these and any memory of other proper types.

It should be understood that, above memory is illustrative but not limiting description. For example, optionally, the memory in implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), etc. That is, memories in implementations of the present disclosure are intended to include, but are not limited to, these and any other suitable types of memories.

There is also provided a computer readable storage medium in an implementation of the present disclosure, configured to store a computer program.

Optionally, the computer readable storage medium may be applied in a network device of implementations of the present disclosure, and the computer program enables the computer to execute corresponding processes implemented by the network device in various methods of implementations of the present disclosure, which will not be repeated here for brevity.

Optionally, the computer readable storage medium may be applied in a mobile terminal/terminal device in implementations of the present disclosure, and the computer program enables the computer to execute corresponding processes implemented by the mobile terminal/terminal device in various methods of implementations of the present disclosure.

There is also provided a computer program product in an implementation of the present disclosure, including computer program instructions.

Optionally, the computer program product may be applied in a network device of implementations of the present disclosure, and the computer program instructions enable the computer to execute corresponding processes implemented by the network device in various methods of implementations of the present disclosure.

Optionally, the computer program product may be applied in a mobile terminal/terminal device of implementations of the present disclosure, and the computer program instructions enable the computer to execute corresponding processes implemented by the mobile terminal/terminal device in various methods according to implementations of the present disclosure.

There is also provided a computer program in an implementation of the present disclosure.

Optionally, the computer program may be applied in a network device of implementations of the present disclosure. When the computer program is run on the computer, the computer is enabled to execute corresponding processes implemented by the network device in various methods of implementations of the present disclosure.

Optionally, the computer program may be applied in a mobile terminal/terminal device of implementations of the present disclosure. When the computer program is run on the computer, the computer is enabled to execute corresponding processes implemented by the mobile terminal/terminal device in various methods of implementations of the present disclosure.

Those of ordinary skill in the art will recognize that exemplary elements and algorithm steps described in combination with implementations disclosed herein may be implemented in electronic hardware, or a combination of computer software and electronic hardware. Whether these functions are implemented in hardware or software depends on a specific application and design constraints of technical solutions. Skilled artisans may use different methods to implement described functions in respect to each particular application, but such implementation should not be considered to be beyond a scope of the present disclosure.

Those skilled in the art may clearly understand that for convenience and conciseness of description, specific working processes of the systems, apparatuses and units described above may refer to corresponding processes in the method implementations and will not be described here.

In several implementations provided by the present disclosure, it should be understood that the disclosed systems, apparatuses and methods may be implemented in other ways. For example, device implementations described above are only illustrative, for example, a division of units is only a logical function division, and there may be other division manners in actual implementation, for example, multiple units or components may be combined or integrated into another system, or some features may be ignored or not executed. On the other hand, a mutual coupling or direct coupling or communication connection shown or discussed may be indirect coupling or communication connection through some interface, apparatus or unit, and may be in electrical, mechanical or other forms.

Unit described as a separate component may or may not be physically separated, and the component shown as a unit may or may not be a physical unit, i.e., it may be located in one place or may be distributed over multiple network units. Some or all of the units may be selected according to actual needs to achieve purposes of implementations.

In addition, various functional units in various implementations of the present disclosure may be integrated in one processing unit, or the various units may be physically present separately, or two or more units may be integrated in one unit.

Functions may be stored in a computer readable storage medium if realized in a form of software functional units and sold or used as a separate product. Based on this understanding, the technical solution of the present disclosure, in essence, or the part contributing to the prior art, or part of the technical solution, may be embodied in a form of a software product stored in a storage medium, including a number of instructions for causing a computer device (which may be a personal computer, a server, or a network device and the like) to perform all or part of the steps of the method described in various implementations of the present disclosure. The foregoing storage medium includes: any medium that may store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but a protection scope of the present disclosure is not limited thereto. Any person skilled in the art may easily conceive variations or substitutions within a technical scope disclosed by the present disclosure, which should be included within the protection scope of the present disclosure. Therefore, the protection scope of the present disclosure should be subject to a protection scope of the claims.

What is claimed is:

1. A method for reporting measurement quantities, comprising:

determining, by a terminal device, measurement quantities of K signals, wherein the measurement quantity comprises reference signal reception quality (RSRQ) and/or a signal to interference plus noise ratio (SINR); and reporting, by the terminal device, the measurement quantities of the K signals to a network device, wherein K is a positive integer; wherein, reporting, by the terminal device, the measurement quantities of the K signals to a network device comprises:

according to a corresponding relationship between the measurement quantities and bit values, determining, by the terminal device, a bit value corresponding to the measurement quantity of each signal of M signals in the K signals; and wherein the bit value is a value represented by bits;

reporting, by the terminal device, the bit value corresponding to the measurement quantity of each signal of the M signals in the K signals to the network device, wherein M is a positive integer and K>M;

wherein reporting, by the terminal device, the measurement quantities of the K signals to a network device comprise:

according to measurement quantities of at least part of the M signals and measurement quantities of (K−M) signals, determining, by the terminal device, a bit value corresponding to the measurement quantity of each signal of the (K−M) signals; and reporting, by the terminal device, the bit value corresponding to the measurement quantity of each signal of the (K−M) signals to the network device;

wherein determining, by the terminal device, a bit value corresponding to the measurement quantity of each signal of the (K−M) signals, comprises:

generating, by the terminal device, a difference of a SINR value of each signal of the (K−M) signals in a differential manner according to SINR values of at least part of the M signals and the SINR values of the (K−M) signals;

determining, by the terminal device, a bit value corresponding to the difference of the SINR value of each signal of the (K−M) signals according to a corresponding relationship between differences and bit values; and determining, by the terminal device, the bit value corresponding to the difference of the SINR value of each signal of the (K−M) signals as the bit value corresponding to the measurement quantity of each signal of the (K−M) signals;

wherein generating, by the terminal device, a difference of a SINR value of each signal of the (K−M) signals in a differential manner according to the SINR values of at least part of the M signals and the SINR values of the (K−M) signals comprises:

respectively differentiating, by the terminal device, the SINR values of the (K−M) signals with the SINR value of one signal of the M signals to generate a difference of the SINR value of each signal of the (K−M) signals;

wherein the K signals comprise a synchronization signal block (SSB) and/or a channel state information reference signal (CSI-RS), the SINR is a L1 (layer 1)-SINR;

wherein in the corresponding relationship between the differences and the bit values, an interval of the differences corresponding to the bit values is 1 dB, and/or the bit values corresponding to the differences are integers greater than or equal to 0 and less than or equal to 15;

when the difference is less than 1 dB, the bit value is 0, and when the difference is greater than or equal to 15 dB, the bit value is 15, or when the difference is less than or equal to 1 dB, the bit value is 0, and when the difference is greater than 15 dB, the bit value is 15, or when the difference is less than 1 dB, the bit value is 15, and when the difference is greater than or equal to 15 dB, the bit value is 0, or when the difference is less than or equal to 1 dB, the bit value is 15, and when the difference is greater than 15 dB, the bit value is 0;

wherein when the measurement quantity is SINR, in the corresponding relationship between the measurement quantities and the bit values, an interval of SINRs corresponding to the bit values is 0.5 dB, and a number of the bit values corresponding to the SINRs is 128, and when the SINR is less than −23 dB, one bit value is used for expression, and when the SINR is greater than 40 dB, one bit value is used for expression.

2. The method of claim 1, wherein the M signals are M signals whose measurement quantities are maximum or minimum among the K signals.

3. The method of claim 1, wherein determining, by the terminal device, the measurement quantities of the K signals, comprises:
measuring, by the terminal device, measurement quantities of N signals; and
selecting, by the terminal device, the measurement quantities of the K signals from the measurement quantities of the N signals, wherein the measurement quantities of the K signals are measurement quantities of K signals whose values of the measurement quantities are maximum among the measurement quantities of the N signals, and/or the measurement quantity of each signal of the K signals is greater than a preset threshold, wherein N is a positive integer and N≥K.

4. The method of claim 1, wherein the K signals are carried on K beams, one of the K signals is carried on one beam.

5. The method of claim 1, further comprising:
receiving, by the terminal device, configuration information sent by the network device, wherein the configuration information comprises information of the measurement quantity needed to be measured by the terminal device.

6. A terminal device, comprising: a processor, a memory and a transceiver, wherein the memory is configured to store a computer program, the transceiver is configured to communicate with other devices under control of the processor, and the processor is configured to call and run the computer program stored in the memory to:
determine measurement quantities of K signals, wherein the measurement quantity comprises reference signal reception quality (RSRQ) and/or a signal to interference plus noise ratio (SINR); and
report, through the transceiver, the measurement quantities of the K signals to a network device, wherein K is a positive integer; wherein, the processor is further configured to call and run the computer program stored in the memory to, according to a corresponding relationship between the measurement quantities and bit values, determine a bit value corresponding to the measurement quantity of each signal of M signals in the K signals; and wherein the bit value is a value represented by bits; report the bit value corresponding to the measurement quantity of each signal of the M signals in the K signals to the network device, wherein M is a positive integer and K>M;
wherein the processor is further configured to call and run the computer program stored in the memory to, according to measurement quantities of at least part of the M signals and measurement quantities of (K−M) signals, determine a bit value corresponding to the measurement quantity of each signal of the (K−M) signals; and report the bit value corresponding to the measurement quantity of each signal of the (K−M) signals to the network device;
wherein the processor is further configured to call and run the computer program stored in the memory to, generate a difference of a SINR value of each signal of the (K−M) signals in a differential manner according to SINR values of at least part of the M signals and the SINR values of the (K−M) signals; determine a bit value corresponding to the difference of the SINR value of each signal of the (K−M) signals according to a corresponding relationship between differences and bit values; and determine the bit value corresponding to the difference of the SINR value of each signal of the (K−M) signals as the bit value corresponding to the measurement quantity of each signal of the (K−M) signals;
wherein the processor is further configured to call and run the computer program stored in the memory to, respectively differentiate the SINR values of the (K−M) signals with the SINR value of one signal of the M signals to generate a difference of the SINR value of each signal of the (K−M) signals;
wherein the K signals comprise a synchronization signal block (SSB) and/or a channel state information reference signal (CSI-RS), the SINR is a L1 (layer 1)-SINR;
wherein in the corresponding relationship between the differences and the bit values, an interval of the differences corresponding to the bit values is 1 dB, and/or the bit values corresponding to the differences are integers greater than or equal to 0 and less than or equal to 15;
when the difference is less than 1 dB, the bit value is 0, and when the difference is greater than or equal to 15 dB, the bit value is 15,
or when the difference is less than or equal to 1 dB, the bit value is 0, and when the difference is greater than 15 dB, the bit value is 15,
or when the difference is less than 1 dB, the bit value is 15, and when the difference is greater than or equal to 15 dB, the bit value is 0,
or when the difference is less than or equal to 1 dB, the bit value is 15, and when the difference is greater than 15 dB, the bit value is 0;
wherein when the measurement quantity is SINR, in the corresponding relationship between the measurement quantities and the bit values, an interval of SINRs corresponding to the bit values is 0.5 dB, and a number of the bit values corresponding to the SINRs is 128, and when the SINR is less than −23 dB, one bit value is used for expression, and when the SINR is greater than 40 dB, one bit value is used for expression.

7. The terminal device of claim 6, where the processor is further configured to call and run the computer program stored in the memory to,
measure measurement quantities of N signals; and
select the measurement quantities of the K signals from the measurement quantities of the N signals, wherein the measurement quantities of the K signals are measurement quantities of K signals whose values of the measurement quantities are maximum among the measurement quantities of the N signals, and/or the measurement quantity of each signal of the K signals is greater than a preset threshold, wherein N is a positive integer and N≥K.

8. The terminal device of claim 6, wherein the K signals are carried on K beams.

9. The terminal device of claim 6, wherein the transceiver is configured to report indexes of the K signals to the terminal device.

10. A network device, comprising: a processor, a memory and a transceiver, wherein the memory is configured to store a computer program, the transceiver is configured to communicate with other devices under control of the processor, and the processor is configured to call and run the computer program stored in the memory to:
obtain measurement quantities of K signals, wherein the measurement quantities comprise signal to interference plus noise ratio (SINR), and K is a positive integer; and
the transceiver is configured to, communicate with a terminal device based on the measurement quantities of the K signals;

wherein the processor is further configured to call and run the computer program stored in the memory to:

obtain n bit values corresponding to the measurement quantities of K signals; and determine the measurement quantities of the K signals according to the bit values corresponding to the measurement quantities of the K signals;

according to the bit values corresponding to the measurement quantities of the K signals and a corresponding relationship between the measurement quantities and the bit values, determine a measurement quantity of each signal of M signals in the K signals, wherein M is a positive integer and K>M;

according to bit values corresponding to measurement quantities of at least part of the M signals and the measurement quantities of (K−M) signals, determine a measurement quantity of each signal of the (K−M) signals;

according to bit values corresponding to differences of SINR values of the (K−M) signals and a corresponding relationship between the differences and the bit value, determine a difference of a SINR value of each signal of the (K−M) signals; and according to the differences of the SINR values of at least some of the M signals and the SINR values of the (K−M) signals, determine the SINR of each signal of the (K−M) signals in a differential manner;

wherein the K signals comprise a synchronization signal block (SSB) and/or a channel state information reference signal (CSI-RS), the SINR is a L1 (layer 1)-SINR; wherein in the corresponding relationship between the differences and the bit values, an interval of the differences corresponding to the bit values is 1 dB, and/or the bit values corresponding to the differences are integers greater than or equal to 0 and less than or equal to 15;

when the difference is less than 1 dB, the bit value is 0, and when the difference is greater than or equal to 15 dB, the bit value is 15, or when the difference is less than or equal to 1 dB, the bit value is 0, and when the difference is greater than 15 dB, the bit value is 15, or when the difference is less than 1 dB, the bit value is 15, and when the difference is greater than or equal to 15 dB, the bit value is 0, or when the difference is less than or equal to 1 dB, the bit value is 15, and when the difference is greater than 15 dB, the bit value is 0;

wherein when the measurement quantity is SINR, in the corresponding relationship between the measurement quantities and the bit values, an interval of SINRs corresponding to the bit values is 0.5 dB, and a number of the bit values corresponding to the SINRs is 128, and when the SINR is less than −23 dB, one bit value is used for expression, and when the SINR is greater than 40 dB, one bit value is used for expression.

11. The network device of claim 10, wherein the M signals are M signals whose measurement quantities are maximum or minimum among the K signals.

12. The network device of claim 10, wherein the K signals are carried on K beams.

13. The network device of claim 10, wherein the transceiver is configured to receive indexes of the K signals reported by the terminal device.

14. The network device of claim 10, wherein the transceiver is configured to:

send configuration information to the terminal device, wherein the configuration information comprises information of measurement quantities needed to be measured by the terminal device.

* * * * *